United States Patent
Yi et al.

(10) Patent No.: US 11,478,712 B2
(45) Date of Patent: Oct. 25, 2022

(54) ONLINE GAMING PLATFORM FOR RANDOM NUMBER GENERATION

(71) Applicants: Min Yi, Manassas, VA (US); Arthur Iinuma, Beverly Hills, CA (US)

(72) Inventors: Min Yi, Manassas, VA (US); Arthur Iinuma, Beverly Hills, CA (US)

( * ) Notice: Subject to any disclaimer, the term of this patent is extended or adjusted under 35 U.S.C. 154(b) by 81 days.

(21) Appl. No.: 17/110,799

(22) Filed: Dec. 3, 2020

(65) Prior Publication Data

US 2021/0086084 A1 Mar. 25, 2021

Related U.S. Application Data

(63) Continuation-in-part of application No. 17/094,003, filed on Nov. 10, 2020, which is a continuation-in-part of application No. 16/228,309, filed on Dec. 20, 2018, now Pat. No. 10,867,474.

(51) Int. Cl.
*A63F 13/73* (2014.01)
*A63F 13/35* (2014.01)

(52) U.S. Cl.
CPC ............... *A63F 13/73* (2014.09); *A63F 13/35* (2014.09)

(58) Field of Classification Search
CPC ........ A63F 13/73; A63F 13/35; G07F 17/326; G06F 7/58

USPC ......................................................... 463/29
See application file for complete search history.

(56) References Cited

U.S. PATENT DOCUMENTS

| | | | |
|---|---|---|---|
| 8,449,378 B2 | 5/2013 | Michaelson et al. | |
| 8,523,657 B2 | 9/2013 | Michaelson et al. | |
| 10,586,427 B2 | 3/2020 | Yi | |
| 2014/0295956 A1 | 10/2014 | Katz et al. | |
| 2014/0370969 A1 | 12/2014 | Lemay et al. | |
| 2016/0027260 A1 | 1/2016 | Pierce et al. | |
| 2018/0025442 A1 | 1/2018 | Isaacson et al. | |
| 2019/0130698 A1* | 5/2019 | Simons | G07F 17/3223 |
| 2020/0152003 A1* | 5/2020 | Georgiou | G07F 17/3244 |
| 2020/0218512 A1* | 7/2020 | Chen | H04L 67/1048 |
| 2021/0286595 A1* | 9/2021 | Huang | G06F 7/588 |

* cited by examiner

*Primary Examiner* — Allen Chan
(74) *Attorney, Agent, or Firm* — Resolute Legal PLLC

(57) ABSTRACT

Various system and method of online gaming platform comprise a random number engine where cryptography and blockchain ledgers are utilized to generate random numbers. The random numbers can be utilized in the play of online wagering games. The online gaming platform is further integrated with a cryptocurrency exchange or transactions such that the games are played with any cryptocurrency and/or fiat currency seamlessly. The players play the games directly from a crypto exchange account.

20 Claims, 7 Drawing Sheets

ONLINE GAMING PLATFORM FOR RANDOM NUMBER GENERATION

CROSS REFERENCE TO RELATED APPLICATION

This application is a continuation-in-part of U.S. patent application Ser. No. 17/094,003 filed Nov. 10, 2020, which is a continuation-in-part of U.S. Pat. No. 10,867,474 filed Dec. 20, 2018, the contents of which are hereby incorporated by reference in their entirety.

FIELD OF THE DISCLOSURE

The present disclosure relates to an online gaming system, and in particular, the present disclosure relates to an online gaming platform having a random number generator for verifying fair gameplay.

BACKGROUND

In recent years, digital currencies have become more popular and have become widely accepted as an alternative to the traditional government issued (fiat) currency. Many digital currencies, particularly Bitcoin, have made their way into a vast range of business transactions. Instead of using fiat currency to buy items, holders of digital currencies can use them to buy both goods and services. Given that digital currencies have made their way into mainstream commerce, there is now a need to allow people to use digital currencies such as Bitcoins as an alternative to fiat currencies when playing online games.

Wager based games such as online casino games, use randomness to assure that any values generated such as card values, dice roll values, or other game values are not pre-determined or otherwise provide any player or the house, an unfair advantage. While wager-based games purport to use randomness in generating card or gameplay values, malfeasance can occur whenever true randomness cannot be assured or proven. Many gaming systems rely on a pseudo-random number generator, in which a private value or seed is used in combination with a random number generating algorithm. If this private seed becomes known, it is possible to predict the outcome of values.

Thus, to ensure fair gameplay in online games, a need exists for a random number generator having a high degree of randomness and that can be corroborated as fair.

SUMMARY OF THE DISCLOSURE

Various implementations of the systems and methods are directed to an online gaming platform that may include a random number generator.

In some implementations, the random number generator provides a high degree of randomness.

In some implementations, the random number generator ensures a fair gameplay.

In some implementations, the online gaming platform enables players to play games with multiple cryptocurrencies simultaneously.

In some implementations, the online gaming platform allows seamless playing of online games with virtual currencies.

In some implementations, the online gaming platform allows playing the games directly from the crypto exchange account.

In some implementations, the online gaming platform allows generating random numbers for wager-based games.

In some implementations, the systems and methods are directed to an online gaming platform that can include, but are not limited to, a gaming engine module, virtual currency module, and a random number engine. In some implementations, the online gaming platform may include an integrated an online cryptocurrency exchange that facilitates or enables players to perform transactions or exchanges of one or more cryptocurrency and one or more fiat currency. In some implementations, the online cryptocurrency exchange can be integrated with online gaming platforms such as casino games, poker games, and the like, such that the games are played with any cryptocurrency and/or fiat currency seamlessly. In some implementations, the online gaming platform enables players to play one or more games directly from the crypto exchange account. In some implementations, the cryptocurrencies may include, but are not limited to, Bitcoin™ (BTC), Litecoin (LTC), XRP (Ripple), or any other cryptocurrency or currency type. In some implementations, the players can play a game using uniform cryptocurrency coins. In some implementations, the player can play a game using different (non-uniform) cryptocurrency coins (or even fiat currency).

In one example implementation, one or more players use the online gaming platform to play a wagering game using Bitcoin. In some implementations, an estimated value in various fiat currencies of one or more player's Bitcoin is shown next to a player's total quantity of Bitcoin. The estimation can be shown one in or more diverse types of currencies such as Dollar, Euros, Yen, Yuan, or any other currency type (including cryptocurrencies) chosen by the players. In this example, the players wager using Bitcoin, but the estimation value (in other currencies) of the Bitcoin is shown for friendly use. In some implementations, the game pot can be shown in Bitcoin and can also be shown in an estimated choice of one or more other currency values. In some implementations, the rake in the game can be taken with Bitcoin. In some implementations, the online gaming platform sets (or resets as the case may be) the Bitcoin to dollar currency value exchange rate at or before the start of the game as per the market value. In some implementations, the online gaming platform maintains the Bitcoin to dollar currency value exchange rate at the same until the game is finished. In some implementations, the online gaming platform varies the Bitcoin to dollar currency value exchange rate as the market changes during gameplay. It should be appreciated that while Bitcoin currency was used for this example, other suitable cryptocurrencies can be used.

In some implementations, the online gaming platform enables one or more different types of cryptocurrencies to be use for a game. As one such example, a first player can use a Bitcoin or a portion of a Bitcoin, a second player can use 10-ETH, a third player can use 3000-XRP, and a Fourth player can use 40 LTC, and a fifth player can use 250 EOS. It should be appreciated that the variation in quantities of the cryptocurrencies can reflect the differences in relative value of these cryptocurrencies. In some implementations, the players can bet or wager in their cryptocurrency and have an estimation illustrating the bet in diverse types of currencies such as USD, Euros, Yen, Yuan, or any other type of currency (including other cryptocurrencies) chosen by the player relative to the cryptocurrency they use to play the game. In some implementations, the players may bet in their own cryptocurrency, but the estimation values are illustrated next to their cryptocurrencies. Thus, the players can play a game with diverse types of cryptocurrencies having diverse estimation values. In some implementations, when the players bet, they can bet in dollar values equivalents of their cryptocurrency. In some implementations, the game pot is displayed in a fiat currency (like the US dollar). In other implementations, another fiat currency or another cryptocurrency can be used for the game pot and the online gaming platform can manage the exchange between the various currencies used by players during the game. In some implementations, a player can play a game in the online gaming platform using one or more currencies (e.g., fiat or cryptocurrencies) for one game. For example, a player may have a first quantity of a first cryptocurrency and a second quantity of a second cryptocurrency. In some implementations, the player may exhaust the first quantity of the first cryptocurrency during a game and need to use the second quantity of the second cryptocurrency to stay in the game. It should be appreciated that in some implementations, the online gaming platform may enable a player to use one or more different currencies (e.g., Bitcoin, Ethereum, and USD) during one play of a game (e.g., during one round of a poker game).

In some implementations the online gaming platform calculates the values of players' cryptocurrencies into an estimated dollar value (or some other suitable currency) during the gameplay. When a pot for a game is awarded to a winning player, the online gaming platform can convert the game pot estimated dollar value into the player's selected currency (e.g., cryptocurrency or fiat currency) coins. In some implementations, a winning player may take the game pot in dollar value. In some implementations, such as in a poker game played using the online gaming platform, a rake can be taken from the pot. In some implementations, the dollar value relative to the available other currencies can be reset at the start of a game to the then existing market values and may remain at the same values until the game is finished.

In some implementations, the one or more types of cryptocurrencies can be used to play a game with the online gaming platform without converting the one or more types of cryptocurrencies to match a particular currency. In such an example scenario the first player may have Bitcoins, the second player may have ETH, the third player may have XRP (Ripple), the fourth player may have LTC, and the fifth player may have EOS. It should be appreciated that the cryptocurrencies used in this example can be any suitable cryptocurrency. In some implementations, the online gaming platform enables players to play using their respective cryptocurrencies directly from their crypto wallet (e.g., players can pay for game play, including placing wagers, from one or more cryptocurrency exchange accounts that are accessible through the online gaming platform). For example, in some implementations, players can use the online gaming platform's interface to request transfer of the player's cryptocurrency from a third party cryptocurrency exchange system, over to the online gaming platform's for purchasing game play (e.g., rounds of a game, wagering, betting, etc.), and then send any accumulated or remaining cryptocurrency stored with the online gaming platform back to the player's connected cryptocurrency exchange account so a player can trade the cryptocurrency or cash out as the player sees fit. In some implementations, the players bet in their own choice of currency. When the game pot is awarded to the winning player, the winner is paid with the respective currencies used by the players involved in the game. In some implementations, the rake is also paid with the currencies used by the players involved in the game. In a poker example, players can place wagers with the currency of their choice at the same table with other players having a currency of their choice, which may be one or more different currencies (e.gg., cryptocurrencies and/or fiat currencies). This facilitates playing directly from the player's crypto wallet while the player is seated with other players each playing with a currency of their respective choice.

In some implementations, the online gaming platform includes a specialized random number engine. In some implementations, the random number generation engine utilizes a blockchain-based random number generator that provides a high degree of randomness, by utilizing a multitude of variable inputs to provide the entropy needed for a provably fair system. In some implementations, the random number generator utilizes a player supplied seed value, an operator platform supplied seed value, and a random value generated from a public blockchain, called a blockhash. Using cryptography, the random number engine can combine these random, and substantially unknowable values and feed them into a random number generating algorithm to produce a verifiably random output in some implementations. In some implementations, randomness is possible since it is improbable for the platform operator to know the seeds of some or all players at any point prior, or for the operator to change these seeds once they have been committed. It is also improbable for any player to know the operator's platform seed. Because a public blockchain's block contents are the result of transactions submitted by potentially tens of millions of public wallets, it is also highly improbable that any individual, entity or machine can predict the block composition at some point in the near future. Therefore, it is improbable that any player or the platform operator will know the resulting blockhash produced by a public blockchain at any point prior to the resulting blockhash from being generated.

DETAILED DESCRIPTION

Subject matter related to a system and method for an online gaming platform having a random number generator will now be described more fully hereinafter. Subject matter may, however, be embodied in a variety of different forms and, therefore, covered or claimed subject matter is intended to be construed as not being limited to any particular implementations set forth herein; examples are provided merely to be illustrative. Likewise, a reasonably broad scope for claimed or covered subject matter is intended. Among other things, for example, the subject matter may be implemented as apparatus and methods of use thereof. The following detailed description is, therefore, not intended to be taken in a limiting sense.

The word "exemplary" is used herein to mean "serving as an example, instance, or illustration." Any implementation described herein as "exemplary" is not necessarily to be construed as preferred or advantageous over other implementations. Likewise, the term "implementations of the present disclosure" does not require that all implementations of the invention include the discussed feature, advantage, or mode of operation.

The terminology used herein is for the purpose of describing particular implementations and is not intended to be limiting of implementations of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Figure 1:
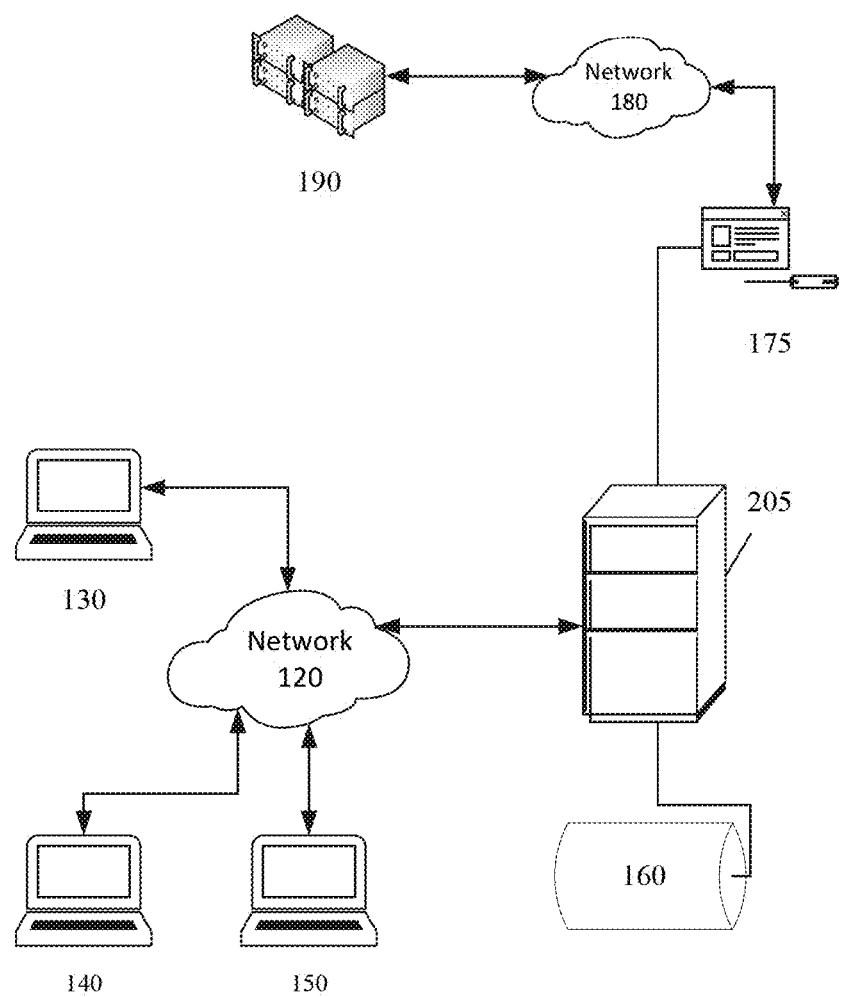
FIG. 1 illustrates an example implementation of an environment diagram showing possible components of the online gaming platform.

Now referring to FIG. 1 which shows an example online gaming platform 100 embodied as a system. The online gaming platform 100 is communicable with at least one client computing device 130 over a network 120. FIG. 1 shows an example online gaming platform 100 in communication with three client computing devices 130, 140, and 150. It should be appreciated that the online gaming platform 100 can be in communication with any suitable number of "n" client computing devices (e.g., 100s, 1000s, etc.). The client computing device can be associated with players participating in online gameplay. The online gaming platform 100 can be further in communication with at least one database 160 for storing software associated with the games and with the account information of the players participating in online gameplay. In some implementations, the online gaming platform 100 can be further in communication to at least one database 160 to store game activity data of the game play hosted by the online gaming platform. It should be appreciated that although one database 160 is illustrated in FIG. 1, in some implementations, any suitable number of databases may be utilized by the system. Similarly, the online gaming platform 100 may include any suitable number of databases to accomplish the system and methods discussed herein. Similarly, FIG. 1 shows the online gaming platform embodied as a system. However, one or more modules of the online gaming platform 100 can also be incorporated into one or more client computing devices. Furthermore, it can be seen in FIG. 1 that the gaming platform 100 may be in communication with the random number engine 175 connected to a blockchain server through a network. In some implementations, the gaming platform 100 may be in communication with the random number engine 175 through network 120. In some other implementations, the gaming platform 100 may be in communication with the random number engine 175 through network 180. In some implementations, network 120 and network 180 can be the same. In one implementation, network 120 and network 180 can be different.

The network 120 and/or the network 180 can be a wired or wireless network. The wired network may include, in some implementations, Digital Subscriber Line (DSL), coaxial cable lines, or optical fiber lines. It should be appreciated that any suitable wired network may be utilized. The wireless network may include, in some implementations, BLUETOOTH, Wi-Fi, Worldwide Interoperability for Microwave Access (WiMAX), an infrared channel or satellite band. The wireless network may also include any cellular network standards used to communicate among mobile devices, including standards that qualify as 3G, 4G, or 5G. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. It should be appreciated that any suitable wireless network may be utilized. The geographical scope of the networks 120/180 may vary widely and the networks 120/180 can be a body area network (BAN), a personal area network (PAN), a local-area network (LAN), e.g. Intranet, a metropolitan area network (MAN), a wide area network (WAN), or the Internet. In some implementations, the networks 120/180 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. In some implementations, the TCP/IP internet protocol suite may include the application layer, transport layer, internet layer (including, e.g., IPv6), or the link layer. The network 120 may be a type of a broadcast network, a telecommunications network, a data communication network, or a computer network.

In some implementations, as illustrated in FIG. 1, the online gaming platform 100 may be in communication with a blockchain system via communications network 180. One blockchain system is represented in FIG. 1 as one or more blockchain nodes 190, described more fully hereinbelow.

Figure 2:
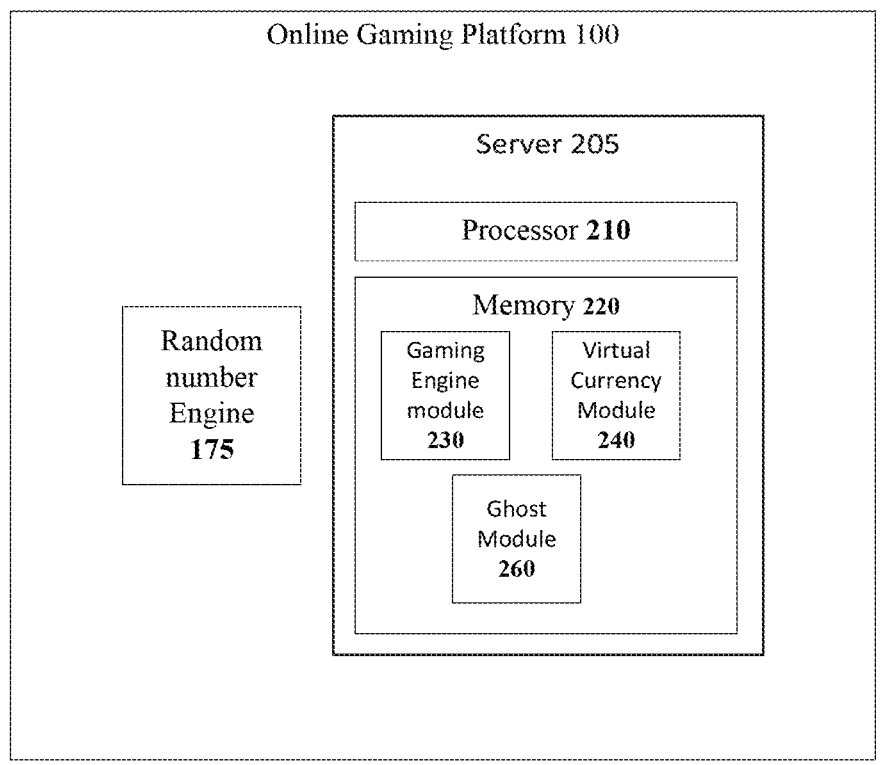
FIG. 2 illustrates an example implementation of a block diagram showing the online gaming platform.

FIG. 2 is a block diagram of the online gaming platform 100 shown as a server 205 and random number engine 175. It should be appreciated that the online gaming platform 100 may include one or more servers such as server 205. In some implementations, multiple servers can be clustered. In some implementations, multiple servers can be distributed across a geographic region, country, and/or the world. In some implementations, the server resources are cloud based server resources such as found in a Platform as a Service that can scale up or scale down as the more or fewer client computing devices (e.g., client computing devices 130, 140, 150) access the online gaming platform 100. In some implementations, the server providing online gaming platform 100 can also be configured in a LAN environment.

In some implementations, the server 205 may include one or more processors 210 and one or more memory 220. The memory 220 may include a gaming engine module 230 stored on the memory 220 and executable by the processor 210. In some implementations, the gaming engine module 230 includes program code that when executed, can generate one or more interactive gameplay instances playable on the client computing device 130, 140, and 150. In some implementations, the memory 220 further includes a virtual currency module 240 stored on the memory 220 and executable by the processor 210. In some implementations, the virtual currency module 240 may have program code that when executed, issues and manages virtual currency accounts in addition to performing currency exchange between fiat currency and virtual currency. Further, as shown in FIG. 2, in some implementations, memory 220 may include ghost module 260 stored on the memory 220 and executable by the processor 210.

In some implementations, the server 205 is configured for storing, processing, and providing provably fair games to a player (where the games include and/or utilize random number generation). For this purpose, the server 205 and the client computing devices may include memory, one or more processors, and one or more communication modules. The processor may be any suitable processor, such as a Field Programmable Gate Array (FPGA), an Application Specific Integrated Circuit (ASIC), a Digital Signal Processor (DSP), and/or the like. The processor may be configured to retrieve data from and/or write data to the memory. The memory may be, for example, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. It should be appreciated that, in some implementations, more than one memory or a combination of types of memory may be utilized by server 205. In one implementation, the server 205 may include one or more hardware-based modules (e.g., DSP, FPGA, ASIC) and/or software-based modules (e.g., a module of computer code stored in the memory and executed by the processor, a set of processor-readable instructions that may be stored in the memory and executed by the processor) associated with executing an application, such as, for example, an online gaming application.

In some implementations, server 205 may be connected to one or more databases 160 (e.g., in memory and/or through a wired and/or a wireless connection) for storing data received from client computing devices connected to the server 205 via communication network 120. The server 205 may further comprise a User Interface (UI) in communication with the database to facilitate the display of data stored in the database.

Any database discussed herein may include relational, hierarchical, graphical, object-oriented structure, flat, noSQL and/or any other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), MySQL, or any other suitable database product. Moreover, the databases may be organized in any suitable manner, for example, as data tables or lookup tables. Database records may be a single file, a series of files, a linked series of data fields, or any other data structure. Association of certain data may be accomplished through any suitable data association technique.

In some implementations, the virtual currency module 240 further comprises program code that when executed, can cause a processor 210 to issue credits, tokens, and gifts as virtual currency bundles.

In some implementation, the virtual currency may be purchased using real currency, credit virtual currency, special virtual currency, ordinary virtual currency, and/or the like. In some implementations, virtual currency may be obtained through the online gaming platform 100 by winning the virtual currency, receiving the virtual currency as a gift, and/or the like.

In some implementations, the online gaming platform 100 can further comprise a ghost module 260 for operably coupling the online gaming platform 100 with other crypto exchange platforms and also third-party crypto exchange platforms. In some implementations, the ghost module 260 couples the gaming module with the virtual currency module seamlessly to enable the player to play the game straight from his/her exchange or wallet. Thus, in some implementations, the ghost module 260 seamlessly integrates the cryptocurrency coins generated under diverse types of blockchain technology in the cryptocurrency market (e.g., the Ethereum token ERC20).

In some implementations, the player can play the game and use the exchange straight from their account with the online gaming platform 100, thereby eliminating the need for the online gaming platform 100 to hold the player's funds.

In some implementations, the online gaming platform 100 may include a digital wallet module. In some implementations, server 205 may be configured to manage one or more different types of currency (e.g., fiat currency, cryptocurrency, etc.). In some such implementations, a player may deposit funds/currency into a digital wallet associated with the player and maintained in the online gaming platform 100. Thus, in some implementations, the online gaming platform 100 can hold the player's funds/currencies during the game play using the online gaming platform 100. The player is at least partially empowered to operate the digital wallet associated with the player.

In some implementations, online gaming platform 100 communicates with a digital wallet module that can reside on a client computing device (e.g., client computing device 130). In some implementations, the digital wallet module can be a standalone application or embedded in a web browser application. In some implementations where the online gaming platform 100 uses a digital wallet module on a client computing device, the player's funds/currencies usable in the online gaming platform 100 are not stored in the online gaming platform 100, but the player's funds/ currencies are stored in the digital wallet associated with the player. Further, in some implementations, the wallet may be encrypted, and the player may be provided with private keys so as to fully empower the player to operate the wallet.

In some implementations, the virtual currency module is configured to generate and store records of one or more transactions. In one implementation, transaction details may be included in a transaction details data structure included as part of the request. For example, the transaction details data structure may be passed in as an argument to a function written a suitable programming language (e.g., the PHP programming language). In some implementations, the transaction details data structure may include a variety of fields such as the unique ID (UID) for a player involved in the transaction, the type or types of virtual currency to be credited, amount of virtual currency to be credited, and/or any other suitable data field).

In some implementations, the online gaming platform 100 can provide games that are configured to be played with particular currencies, such as Bitcoin™ (BTC), Litecoin (LTC), XRP (Ripple) or any other currency/cryptocurrency type. In some implementations, the online gaming platform 100 enables the players to play games with uniform cryptocurrency coins. In some implementations, the online gaming platform 100 enables players to play games with one or more different cryptocurrency coins. In some implementations, the online gaming platform 100 enables players to play games with one or more different currencies (e.g., fiat and/or cryptocurrencies).

In one implementation, the online gaming platform 100 is configured to enable players to play in a uniform cryptocurrency of Bitcoin currency. In some implementations, the online gaming platform 100 enables client computing devices (e.g., client computing devices 130, 140, etc.) to display an estimate of the Bitcoin currency relative to a fiat currency next to the total available Bitcoin currency for a player at a client computing device. For example, the estimation can be shown in one or more types of real currencies such as Dollar, Euros, Yen, Yuan, or any other currency type (e.g., including cryptocurrency) chosen by the players. In some implementations, while the players are playing a game and betting in Bitcoin, the online gaming platform 100 may provide an estimation value of the Bitcoin in one or more other currencies. In some implementations, the online gaming platform 100 displays the game pot in Bitcoin and may also provide an estimated value in one or more selected currencies. In some implementations, the rake (e.g., commission fee taken by the house or dealer) in the game can be taken with Bitcoin currency. In some implementations, as noted above, the dollar currency value relative to Bitcoin can be reset before start of the game (or at some other suitable time) as per the market value. In some implementations, the online gaming platform 100 maintains Bitcoin value relative to the dollar until the game is finished. That is, in some implementations, online gaming platform 100 keeps the value of Bitcoin to the US dollar the same during a play of a game, despite potential market fluctuations. In some implementations, online gaming platform 100 tracks the value of Bitcoin to the US dollar during a play of a game and calculates wager values, pot values, and rake values during the play of the game to keep pace with market fluctuations.

In some implementations, the online gaming platform 100 enables the player to convert virtual currency into a requested real currency or vice versa. For this purpose, the online gaming platform 100 may determine a conversion rate between the real currency and the requested virtual currency. The online gaming platform 100 may determine the conversion rate with one or more third party cryptocurrency exchanges. In some implementations, the online gaming platform 100 maintains its own cryptocurrency exchange. In some implementations, the conversion rate may be static (e.g., it may be retrieved from a locally stored database). In another example implementation, the conversion rate may be calculated dynamically (e.g., based on information associated at the time of the beginning the game). Accordingly, in some implementations, the present disclosure enables embedding the currency conversion to the online games from a live cryptocurrency exchange market.

In another example implementation of a game played on the online gaming platform 100, diverse types of cryptocurrencies can be used for a game (e.g., a poker game). In one example, a first player may use Bitcoins, a second player may use 10 ETH (Ethereum) coins, a third player may use 3000 XRP (Ripple) coins, a fourth player may use 40 LTC (Litecoin) coins, and a fifth player may use 250 EOS coins. The different numbers of coin may reflect the difference in values of the various cryptocurrencies relative to each other. Thus, in some implementations, the online gaming platform 100 enables players to play in the cryptocurrency of their own choosing. In some implementations, the online gaming platform 100 calculates relative values of the played cryptocurrencies to one or more other types of other currencies (e.g., fiat currency or cryptocurrency) such as USD, Euros, Yen, Yuan, or any other type of currency chosen by the players. The players bet in their own coin, but the estimation values are illustrated next to the cryptocurrencies. The players are in the game with diverse types of coins having different estimation values relative to other currencies. In some implementations, when the players place wagers/betting, the player may bet in dollar values of their selected currency. In some implementations, the online gaming platform 100 maintains the game pot in a single currency (e.g., USD).

In some implementations, the online gaming platform 100 calculates the values of the player's selected currency into an estimated dollar value during the gameplay. When the online gaming platform 100 determines a winning player, the online gaming platform 100 may award the game pot to the winning player. The online gaming platform 100 may convert the game pot's dollar value (or other suitable currency) into the player's selected currency (e.g., LTC, Bitcoin, etc.) and provide the winning player with the game pot in the converted currency. In some implementations, the rake is taken as a percentage of the winner's coins in the converted currency. In some implementations, the rake is taken as a percentage of the game pot's dollar value. In some implementations, the online gaming platform 100 resets the dollar currency value relative to other currencies at start of the game to the market value and keeps the relative values the same until the gameplay of the game is finished (e.g., when the winner is paid the game pot).

In yet another example implementation where the player can play a game through the online gaming platform 100 using their own selected currency, the online gaming platform 100 enables players to play a game from their own cryptocurrency wallets. In some implementations, the players enable access to the player's cryptocurrency wallets using application programming interfaces to push and/or pull cryptocurrency from the player's cryptocurrency wallets for gameplay. In some implementations, when the online gaming platform 100 awards the game pot to a winning player, the online gaming platform 100 pays the winning player with the respective currencies of one or more of the players involved in the game and also the rake is paid with the currency of one or more of the players involved in the game. That is, in some implementations, the online gaming platform 100 does not convert one or more of the currencies to other currencies. For example, if a poker game is played with Bitcoin, XRP, and LTC, the online gaming platform 100 may award a winning player in Bitcoin, XRP, and LTC (e.g., the currencies used to form the game pot). Similarly, the rake percentage may be taken in Bitcoin, XRP, and LTC. Thus, in some implementations, players play with a currency of their choice (e.g., a game of poker can be played with one or more different currencies). This facilitates playing directly from the player's crypto wallet while seated with other players playing with currency of their choice. In some implementations, the players are responsible for converting any won currencies into a preferred currency. In some implementations, the conversion can be performed through an exchange associated with the online gaming platform 100. In some implementations, the players can perform the currency exchange through a third-party exchange. In an example implementation, a first player owns a crypto wallet with Bitcoin currency and plays a game through the online gaming platform 100 with a second player that owns a different currency such as XRP currency. In the scenario that the first player wins the game, the online gaming platform 100 awards the game pot with one or more of the coins that were played with. That is, the online gaming platform 100 pays the first player with Bitcoin currency along with the wagered XRP of the second player. Further, in some implementations, the rake is paid with the currency of one or more of the players involved, which is Bitcoin and XRP currencies.

In some implementations, the online gaming platform 100 can enable a game to be played with fiat currency and/or cryptocurrency. In some implementations, real/fiat currencies representing different countries can be used for gameplay at a game (e.g., such as a poker game) along with one or more virtual currencies. In some implementations, players may use a virtual wallet with real money or a real wallet with real money along with a virtual wallet with virtual money and participate in the online game in the online gaming platform 100. In some implementations, the players can wager/bet in one of a real/fiat currency and one of a virtual currency. When the online gaming platform 100 awards a game pot to a winning player, the game pot can be awarded in a combination of the real/fiat currency and a virtual currency. Likewise, in some implementations, the rake can be taken in a combination of the real/fiat currency and a virtual currency. In some implementations, the online gaming platform 100 may convert any of the currencies used to play the game into one or more other currencies before paying out any winnings or while wagers are made at the request of a player.

In some implementations, the online gaming platform 100 disclosed herein integrates a crypto exchange platform with online poker game, for example, which distinguished the present disclosure from prior art online games with cryptocurrency. The integration of the crypto exchange platform with the online gaming platform as disclosed herein can eliminate the need for the player to buy a particular currency to participate in a game (e.g., host (game industry) coin to play a game) and enables players to play games with the currency of their choice and receive winnings in that same currency coin or another currency of their choice.

In some implementations, all or a portion of the online gaming platform 100 may be configured as an application in the client computing device. Applications, as used herein, include any set of computing instructions. Applications instruct an electronic device to perform specified functions. Applications typically contain logic and methods for accessing, manipulating, and storing data. Examples of applications include word processors, web browsers, email clients, games (e.g., chess games), and media players. Applications may contain instructions on displaying and formatting data. For example, an application may instruct an electronic device to access certain data and display it in a specified format and/or at a specified time. Applications may be transported via any method suitable for such purpose. For example, the applications may be downloaded to the client computing device via a Web browser or may be transported to the client computing device using a "push" type operation via a network protocol over a cable or wireless infrastructure. Possible means for pushing an application or application reference include, but are not limited to email, embedding in a Web page, part of an RSS feed, a WAP™ Push or a Bluetooth™ Transmission. The system for deploying applications to the client computing device may optionally include a runtime environment for the application. A runtime environment is software that allows a client computing device to execute application code.

In one implementation, virtual currencies are transferred between accounts by utilizing funds held "on-platform" to perform gameplay, and crediting said funds back to an "off-platform" source at the conclusion of a round of gameplay. The virtual currency can be transferred off-platform, directly to a players blockchain wallet. In some implementations, the player is the only individual who possesses the cryptographic keys to this the player's blockchain wallet, and therefore is the sole owner of the funds credited. Also, the mechanism in which this transfer and exchange occurs in performed programmatically using the standards provided by the blockchain technologies that support each of the virtual currencies described such as Litecoin or Ethereum. In some implementations, this allows the exchange and off-platform transfer of virtual currencies to occur seamlessly and substantially in real-time. This can significantly reduce the risk that the players funds are stuck in a centralized system.

Furthermore, these funds can be utilized by the player in any way they see fit. It is no longer dependent on the "platform" once it is transferred "off-platform." Additionally, because of the use of a virtual currency exchange in the online gaming platform 100, the player can select any number of a dozen or more virtual currencies they wish to redeem their funds in, negating any risks of using a single proprietary virtual currency standard.

In some implementations, online gaming platform 100 includes a random number generator engine 175 (also referred to herein as random number engine 175 or RNG server 175). In some implementations, random number engine 175 can be a blockchain-based random number generator that provides a high degree of randomness to online gaming platform 100. In some implementations, random number engine 175 may provide a high degree of randomness by utilizing a multitude of variable inputs (e.g., one or more variable seed values) to create random numbers or values. In some implementations, the random number engine 175 can utilize a combination of randomly derived seed values (e.g., a player supplied seed value, a platform supplied seed value, and a random value generated from a public blockchain referred herein as a blockhash) to generate random numbers. In some implementations, the random number engine uses cryptography to combine the randomly derived seed values with secure values and subsequently feeds the values into a random number generating algorithm (e.g., an RGA or any other suitable random number generation algorithm) to produce a verifiably random number output.

Figure 3:
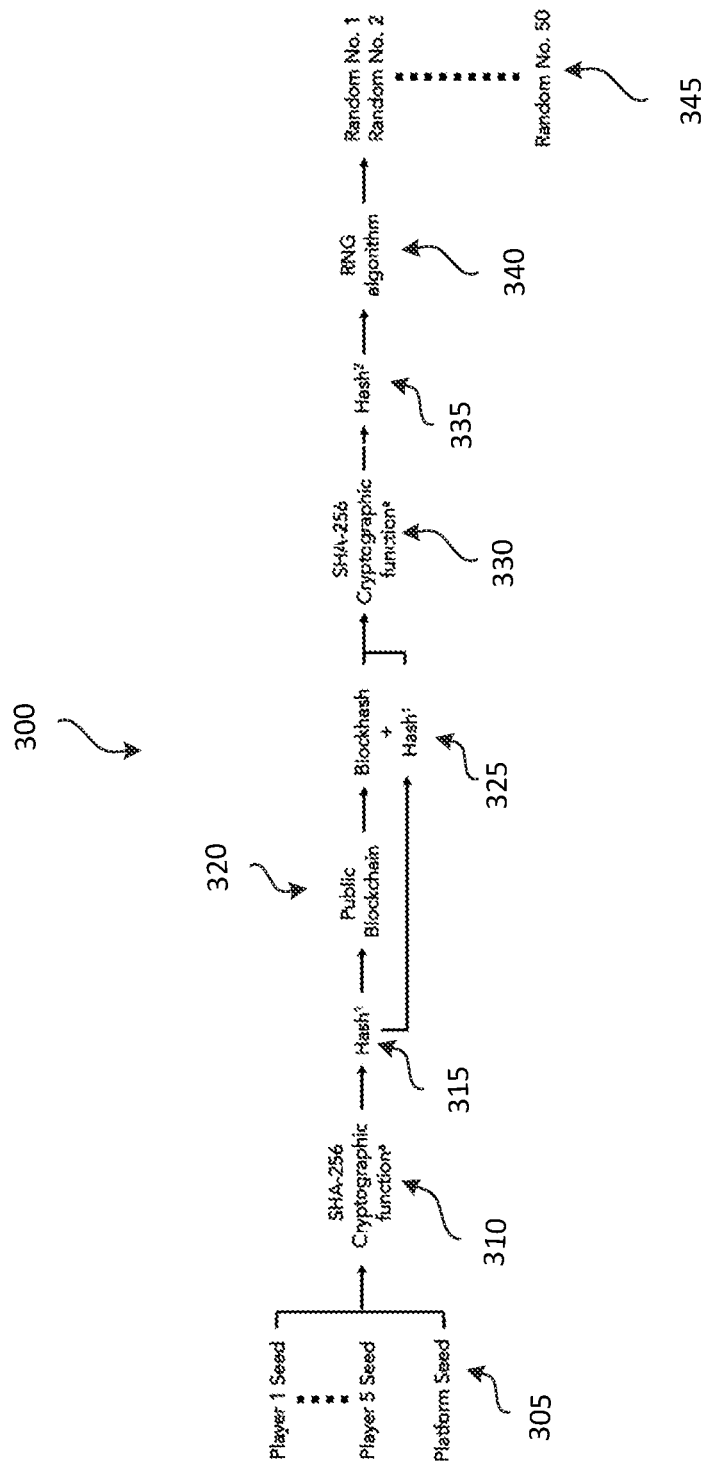
FIG. 3 illustrates an example implementation of a process flow diagram for the random number engine.

FIG. 3 shows one implementation of a process flow diagram illustrating process flow 300 for random number engine 175. Process flow 300 begins, in one implementation, when a player that is participating in gameplay on online gaming system 100 supplies or inputs a random value that may be utilized by random number engine 175. The player input random value is referred to hereinafter as a player's seed 305. In some implementations, the player's seed 305 can be input into online gaming system 100 as any combination of words, characters, symbols, numbers, or values. It should be appreciated that the player's seed 305 may be input into online gaming system 100 via any suitable input mechanism allowing player interaction with online gaming system 100. In some implementations, a player may input the player's seed when the player initiates a game play or a game play session (e.g., when a player joins a virtual card table for play of a card game; when a player initiates slot machine play, etc.). In some implementations, the player's seed 305 may be stored in an account associated with the player. For example, in some implementations, a player may create a game play account which may be stored in database 160 or in any other suitable storage location. Such a player account may store a variety of player data including a player chosen random value which serves as a player's seed 305. In some such implementations, the player's seed 305 may be retrieved from the storage location associated with the player when the player initiates a game play or a game play session. In some implementations, one or more players participating in a game at the virtual card table will provide their respective player's seed 305 to be run through a hash generating algorithm 310 to generate a first hash value 315. In some implementations, player's seed 305 for each participating player in a game at the virtual card table is used with the hash generating algorithm 310 to generate the first hash value 315. In some implementations, the online gaming platform 100 may randomly select one or more player's seed 305 from the participating players in a game at the virtual card table for use with the hash generating algorithm 310 to generate the first hash value 315. In some implementations, player's seed 305 represents multiple player seeds from one or more different active games running in the online gaming platform 100. In some implementations, player's seed 305 represents multiple player seeds from one or more different games that are about to start in the online gaming platform 100.

In some implementations, a platform seed may be optionally or additionally input by the online gaming system 100 operator as an additional random value input to random number engine 175. In some implementations, the online gaming system 100 may generate a platform seed for one or more games operated. In some implementations, the online gaming system 100 operator may specify a unique platform seed for a game operated (e.g., a unique platform seed for a virtual card table operated; a unique platform seed for a virtual slot machine operated; etc.). Although one platform seed is illustrated in FIG. 3, it should be appreciated that two, three, or any suitable number of platform seeds may be utilized. It should further be appreciated that the online gaming operator's platform seed may be predetermined and/or assigned in any suitable manner (e.g., sequential selection from a predetermined listing; randomly generated or determined from, for example, a timing signal, when a platform seed is requested). Because the platform's seed is not known to any online gaming system 100 player, and because it is highly unlikely that any online gaming system 100 player or players will know the platform operator's seed(s), process flow 300 security and integrity are enhanced. In some implementations, the received player's seed(s) and any platform seed(s) may be processed with a hash generating algorithm 310 to generate a first hash value 315 (hash[1], FIG. 3). In one implementation, the hash generating algorithm 310 may be a cryptographic function such as a secure hash algorithm (SHA) such as a SHA-256 cryptographic function. It should be appreciated, however, that in other implementations the random number engine module can use any hash generating algorithm, such as but not limited to a message digest algorithm (e.g., MD-5), or other secure hash algorithm (e.g., SHA-3). In some implementations, first hash value 315 can be published on the online gaming platform 100 (e.g., saved in memory 220, database 160, or other suitable memory store location) and simultaneously written into a decentralized public (and immutable) blockchain ledger 320. In one implementation, public blockchain 320 may be Ethereum. It should be appreciated, however, that any suitable public blockchain ledger may be utilized. As can be appreciated, recording the hash value with the blockchain can provide corroborating evidence for future verification and assurance that the player's seed has unlikely been modified. That is, the hash value can provide assurances to players and operators of online gaming system 100 that the seeds were unlikely to be changed or modified by malfeasance. Furthermore, by recording the hash value with the blockchain, players may be reassured that the player-entered seed introduced variability into the random number generator engine 175, and the random variables being supplied by random number engine 175 are unlikely to be already known.

In some implementations, after the hash value 315 is written to the blockchain and is processed by a miner (e.g., the blockchain miner validates the hash value 315 and adds hash value 315 to the blockchain ledger), the blockchain 320 creates and returns blockhash 325. Blockhash 325 contains the sum of one or more transactions occurring in the public blockchain 320. Blockhash 325 is truly random because it is can be based upon the sum of the tens of millions of public wallet addresses and transactional information occurring in the public blockchain (e.g., Ethereum or other suitable blockchain). Once created, in some implementations, blockhash 325 can be combined with the first hash produced by the player's seeds (hash[1] FIG. 3, 315, 325). The combination of blockhash 325 and the first hash[1] may, in some implementations, be subjected to a second secure hash algorithm (SHA) such as a SHA-256 cryptographic function 330 which produces final hash value 335 (e.g., hash[2]). In some implementations, the final hash value 335 can then be processed with a random number generator algorithm 340 which produces an output that supplies the online gaming platform 100 with a one or more random values (e.g., numbers) 345. In some implementations, the one or more random values 345 are subsequently returned to gaming engine module 230 for use in game play.

Figure 4:
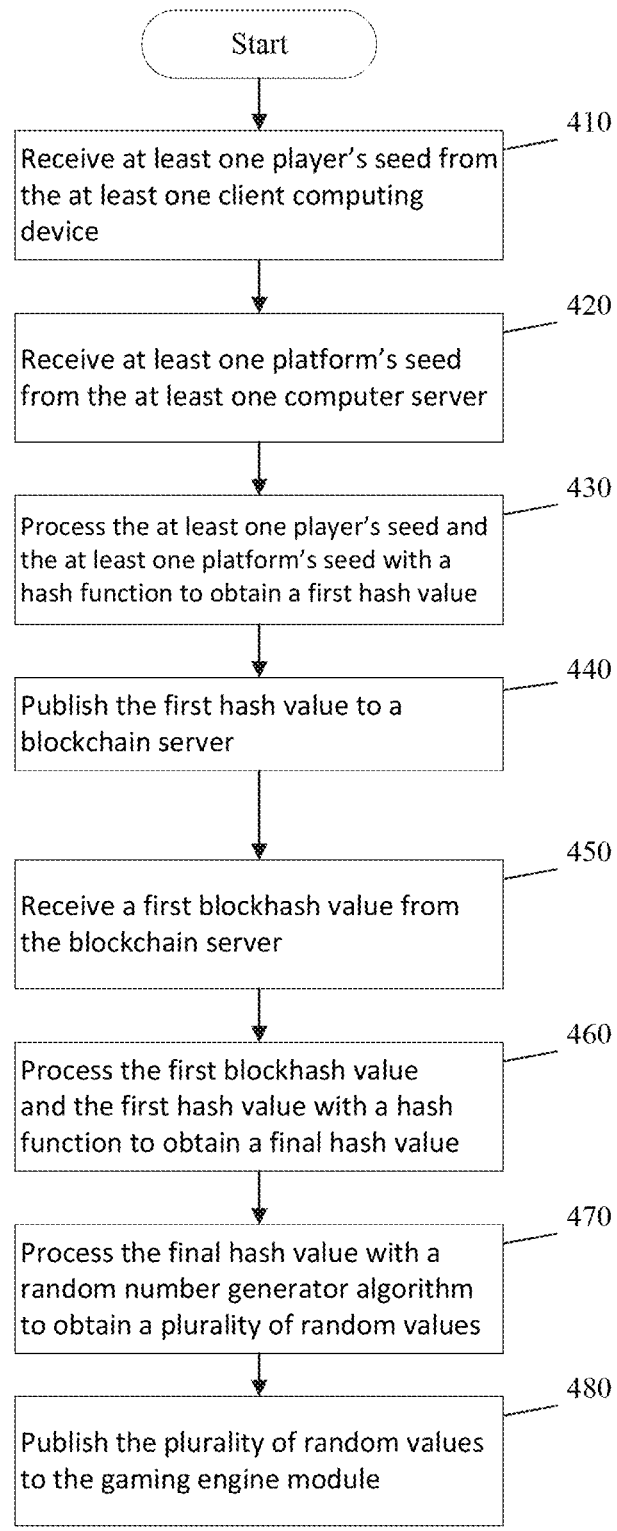
FIG. 4 illustrates a flow chart showing an example implementation of a method of random number generation using the random number engine.

Turning to FIG. 4, an example implementation of a method of random number generation using the random number engine 175 is shown. In some implementations, the random number engine 175 comprises program code that when executed, can cause a processor 210 to generate random numbers.

In one implementation, random number engine 175 receives at least one player's seed from at least one client computing device as illustrated at block 410. For example, a player located at client computing device 130 and joining an online gaming platform 100 may be prompted to enter a player selected (and known only to the respective player) combination of alphanumeric letters and/or numbers via a keyboard or similar input device (not shown). It should be appreciated that seed values may be received from each player utilizing the online gaming platform 100. It should further be appreciated that any suitable biometric data, (e.g., the player's fingerprint that can be converted into a machine readable data such, but not limited to, an alphanumeric or hexadecimal string), may serve to provide the player's seed. The player's alphanumeric character data entry may be forwarded to random number engine 175 to function as that player's seed value. Similarly, random number engine 175 may receive at least one online gaming platform 100 operator's seed(s) (e.g., platform seed) from at least one platform operator (e.g., the platform operator's computer server) as illustrated at block 420.

As shown in block 430, the at least one player's seed and the at least one platform operator's seed can be, in some implementations, processed with a hash function to obtain a first hash value. As noted hereinabove, any suitable hash function (e.g., SHA-256) may be utilized to create the first hash value from the received seeds.

In some implementations, the first hash value can then be published to a blockchain server, at block 440. After publishing, in some implementations, the random number engine 175 may receive a first blockhash value from a blockchain server, as illustrated at block 450. In some implementations, the first blockhash value and the first hash value can then be processed with a second hash function to obtain a final hash value, as illustrated at block 460. It should be appreciated that the second hash function may be any suitable hash function and may be the same hash function as the first hash function, or the second hash function may be a different hash function (e.g., SHA-3 or other suitable hash function).

As shown in block 470, in some implementations, when the final hash value has been generated, the random number engine can then process the final hash value with a random number generator algorithm to obtain a plurality of random values. In some implementations, the plurality of random values can then be published, as illustrated in block 480, to a gaming engine module 230 for further processing to use in online game play by the online gaming platform 100.

It should be appreciated that, in some implementations, the Ethereum blockchain can produce a blockhash approximately every 12 seconds. Although the hash rate may not be frequent enough to supply a new random hash for every round of gameplay occurring in a very busy online gaming platform, it should be appreciated that the same hash value may be used for concurrent rounds of game play within that 12 second window, or until the next blockhash has been produced. Additionally, because multiple random numbers may be generated from the final hash value, gameplay does not have to be delayed. Advantageously, the risk of any player gaining an unfair advantage is minimized since the blockhash from a blockchain can change every 12 seconds. It should be appreciated that the 12 second interval may change when using different blockchain systems. In some implementations, as blockchain systems improve, the delay between generating blockhashes may be minimized.

In some implementations, the system and method of random number generation relies on a public blockchain with sufficient distribution or decentralization. Indeed, a blockchain operated by a single entity could allow the possibility of that entity manipulating the results of any appended block, thereby negating any randomness that would otherwise be possible via use of a public blockchain for random number generation. However, it should be appreciated that a widely distributed and decentralized public blockchain can alleviate malfeasance concerns. It should further be appreciated that in some implementations, the random number engine 175 may rely on relatively fast transaction time, such that blocks are generated in sufficient volume and frequency to reduce the risk of prediction or collusion. In some implementations, the random number engine 175 may rely on a blockchain with a relatively low cost to perform transactions so that the cost of utilizing the blockchain technology does not outweigh the economic benefits of its use. In one implementation, the Ethereum blockchain can be a suitable candidate to implement the random number generator and is expected to operate long term. As noted above, other suitable blockchain system can be used in place of Ethereum.

Figure 5A:
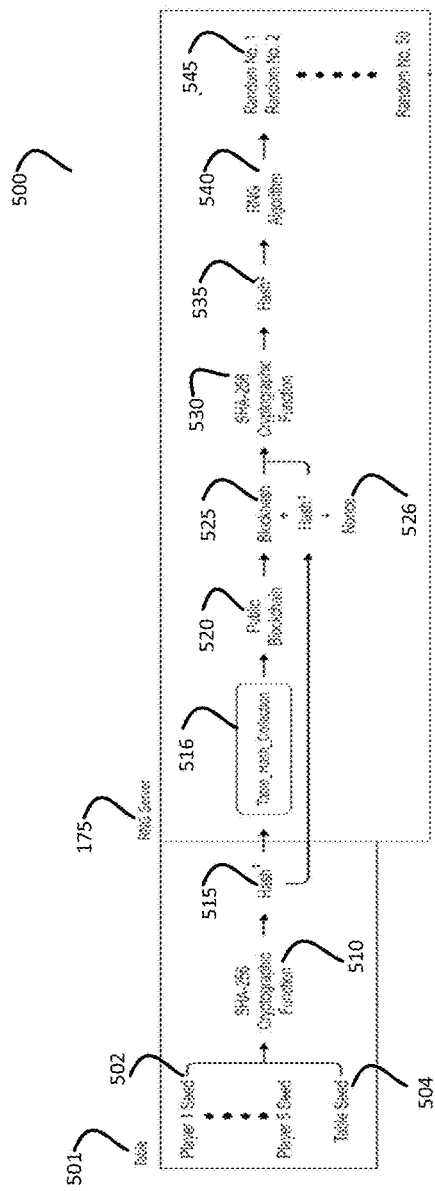
FIGS. 5A and 5B illustrate another example implementation of a process flow diagram for the random number engine.
Figure 5B:
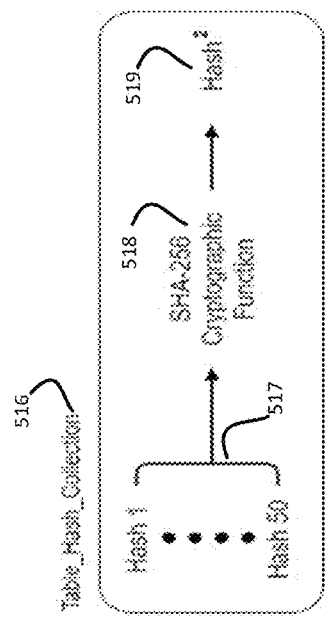

FIGS. 5A and 5B illustrate another implementation of a process flow diagram illustrating a process flow 500 for random number engine 175. Process flow 500 is similar to process flow 300, described hereinabove, and where applicable, like processes have been similarly enumerated. To the extent process flow is similar, the descriptions set forth above in relation to process flow 300 are equally applicable in some implementations of process flow 500. Process flow 500 introduces additional randomness to the random number engine 175 and additionally provides further technological improvements to the random number generation process. Although process flow 500 is described as implemented on a virtual game table 501 (e.g., a virtual poker table a virtual blackjack table), it should be appreciated that the principles described herein are applicable to any game requiring random number generation (e.g., a virtual slot machine; a virtual bingo game; etc.) and implemented via gaming module 230.

Turning to FIGS. 5A and 5B, process flow 500 begins, in one implementation, with a player participating in gameplay on online gaming system 100 at a virtual gaming table 501. The player, upon entry to virtual gaming table 501, supplies or inputs a random value that is utilized by random number engine 175. The player supplied or input random value is referred to hereinafter as a player's seed 502. In some implementations, the player's seed 502 can be input into online gaming system 100 as any combination of words, characters, symbols, numbers, or values. It should be appreciated that the player's seed 502 may be input into online gaming system 100 via any suitable input mechanism (not shown) allowing player interaction with online gaming system 100. In some implementations, a player may input the player's seed when the player initiates a game play or a game play session (e.g., when a player joins a virtual card table for play of a card game; when a player initiates slot machine play, etc.). In some implementations, the player's seed 502 may be stored in an account associated with the player. For example, in some implementations, player(s) may create a game play account which may be stored in database 160 or in any other suitable storage location. Such a player account may store a variety of player data including a player chosen random value which serves as a player's seed 502. In some such implementations, the player's seed 502 may be retrieved from the storage location associated with the player when the player initiates a game play or a game play session. In some implementations, one or more players participating in a game at the virtual card table will provide their respective player's seed 502 to be run through a hash generating algorithm 510 to generate a first hash value 515. In some implementations, player's seed 502 for each participating player in a game at the virtual card table is used with the hash generating algorithm 510 to generate the first hash value 515. In some implementations, the online gaming platform 100 may randomly select one or more player's seed 502 from the participating players in a game at the virtual card table for use with the hash generating algorithm 510 to generate the first hash value 515. In some implementations, player's seed 502 represents multiple player seeds from one or more different active games running in the online gaming platform 100. In some implementations, player's seed 502 represents multiple player seeds from one or more different games that are about to start in the online gaming platform 100.

In some implementations, a table seed 504 may be optionally or additionally input by the online gaming system 100 operator as an additional random value input to random number engine 175. In some implementations, the online gaming system 100 may specify a table seed 504 for one or more tables operated. In some implementations, the online gaming system 100 operator may specify a unique table seed 504 for each table operated. That is, in some implementations, as tables are created by gaming engine module 230, a predetermined table seed 504 may be retrieved from a memory or a table seed 504 may be randomly generated. Although one table seed 504 is illustrated in FIG. 5A, it should be appreciated that two, three, or any suitable number of table seeds 504 may be utilized. It should further be appreciated that the table seed 504 may be predetermined and/or assigned in any suitable manner (e.g., sequential selection from a predetermined listing; randomly generated or determined from, for example, a timing signal, when a table seed 504 is requested). Because the table's seed 504 is not known to any online gaming system 100 player, and because it is highly unlikely that any online gaming system 100 player or players will know other player's seed(s) or the table's seed(s) 504, process flow 500 security and integrity are enhanced.

In some implementations, the received player's seed(s) 502 and the table seed(s) 504 may be processed with a hash generating algorithm 510 to generate a first hash value 515. In one implementation, the hash generating algorithm 510 may be a secure hash algorithm (SHA) such as a SHA-256 cryptographic function. It should be appreciated, however, that in other implementations, the random number engine module can use any hash generating algorithm, such as but not limited to a message digest algorithm (e.g., MD-5), or other secure hash algorithm (e.g., SHA-3). In some implementations, first hash value 515 may be published on the platform (e.g., saved in memory 220, database 160, or other suitable memory store location). Alternatively, or additionally, first hash value 515 may be published to table hash collection 516, illustrated in greater detail in FIG. 5B.

FIG. 5B illustrates table hash collection 516. In some implementations, table hash collection 516 stores one or more hashes 517 processed from the player's seed(s) 502 and table seed(s) 504. In some implementations, when a new player enters play at table 501 (e.g., a new player seed is entered), a new first hash value 515 may be generated. In some implementations, this new first hash value 515 may be stored as "Hash 1" (FIG. 5B) in the group of hashes 517. As illustrated in FIG. 5B, the grouping of hashes 517 may include fifty hash values (e.g., a current first hash value and forty-nine previous hash values). It should be appreciated, however, that in some implementations, a lesser or a greater number of hashes may be included in the grouping of hashes 517. It should further be appreciated that the grouping of hashes 517 may be a processed in first-in-first-out (FIFO) stack or any suitable buffer or storage arrangement with a hash generating algorithm 518.

The grouping of hash values 517 may be, in some implementations, processed with a hash generating algorithm 518 to generate a second hash value 519 (e.g., hash$^2$ FIG. 5B). In some implementations, the hash generating algorithm 518 may be a secure hash algorithm (SHA) such as a SHA-256 cryptographic function. As noted hereinabove, in some implementations, any suitable cryptographic function may be utilized to generate the second hash value 519. It should be appreciated that, in some implementations, including a plurality of table hashes (e.g., a plurality of the first hash values, as described herein) allows for greater randomization and allows for the availability of sufficient hash values to continue generation of random numbers in the event heavy processing loads delay the generation of a new first hash value at blocks 510 and 515. That is, in some implementations, when processing delays occur, the random number generation can continue based upon the second hash value 519 which, in turn, is a value produced by processing the grouping of hashes 517. In this manner, process 500 maintains sufficient randomness and security in the event of processing delays and thereby providing a technological improvement to previously known random number generation processes.

Returning to FIG. 5A, the second hash value 519 (e.g., the output of table hash collection operation 516 of FIG. 5B) may be, in some implementations, published in public block chain 520, in a similar manner as described above in relation to process flow 300 of FIG. 3. In one implementation, public blockchain 520 may be Ethereum. It should be appreciated, however, that any suitable public blockchain ledger may be utilized. As can be appreciated, recording the second hash value with the blockchain can provide corroborating evidence for future verification and assurance that the player's seed has not been modified. That is, in some implementations, the hash value assures players and operators of online gaming system 100 that the seeds are unlikely to be changed or modified by malfeasance. Furthermore, by recording the hash value with the blockchain, players may be reassured that the player-entered table seed introduced variability into the random number generator engine 175 process, and the random variables being supplied by random number engine 175 are not already known.

In some implementations, after the second hash value 519 is written to the blockchain 520 and is processed by a miner (e.g., a blockchain miner validates the hash value 519 and adds hash value 519 to the blockchain ledger), the blockchain 520 creates and returns blockhash 525. In some implementations, blockhash 525 contains the sum of one or more transactions that have occurred on the public blockchain 520 at the time the blockhash was created. For many public blockchains, the blockhash 525 is extremely difficult to predict or control because it can be based upon the sum of more than one transaction occurring on the public blockchain at approximately the same time by different, unconnected people, that may be using the public blockchain for different and unrelated purposes. In some implementations, because a public blockchain may include hundreds if not millions of transactions occurring per day by many unknown third parties, it becomes extremely difficult to predict or control the outcome of the blockhash at any given time that a blockhash is generated.

Once created, in some implementations, blockhash 525 can be grouped with the first hash 515 produced by the table seeds (hash$^1$ FIG. 5A). The grouping of a blockhash 525 from the public blockchain and the first hash 515 (e.g., created via cryptographic processing of random player and table seed values) may, in some implementations, be further grouped with a nonce value 526. In some implementations, nonce value 526 adds yet another random factor into process flow 500 and provides additional randomness to the random number generation process when unforeseeable and/or unpredictable processing delays occur at public blockchain 520's ledger. For example, in some implementations, a blockchain system may not update its ledger with the table seed hash 519 before generating a blockhash 525. It should be appreciated that a public blockchain's ledger write times may be longer than suitable for the online gaming platform 100 as part of the process of generating random numbers (e.g., a public blockchain system may not be able to create enough new blockhashes 525 based on new table seed hashes 519 to keep up with the demand of new players or new tables that need generation of random numbers). Consequently, when the public blockchain system generates a blockhash 525, such a blockhash may not include the values of table seed hash 519. The addition of first hash 515 and/or the nonce value 526 serves to ensure sufficient randomness and provides additional technological improvements to ensure continued processing in the event of internal and/or external processing delays. Nonce 526 may also provide a hedge against the rare occurrence of cryptographic hash collisions created with cryptographic function 530 (e.g., a situation that results when two distinct inputs into a hash function produce identical outputs). In some implementations, nonce value 526 may be an index value that is advanced after each processing request. In some implementations, nonce value 526 may be derived from a date/time stamp. In yet some other implementations, nonce value 526 may be derived from a pseudo-random number generator or any other suitable source of random value generation.

Returning to FIG. 5A, in some implementations, the online gaming platform 100 may apply a secure hash algorithm (SHA) such as a SHA-256 cryptographic function 530, or other suitable cryptographic function to the grouping of blockhash 525, first hash value 515, and nonce value 526. As can be appreciated, such cryptographic processing can produce a final hash value 535. In some implementations, the final hash value 535 can then be processed with a random number generator algorithm 540 which produces an output that supplies the online gaming platform 100 with one or more random values 545 (e.g., 50 or some other suitable quantity of random numbers). In some implementations, the one or more random values 545 are subsequently returned to gaming engine module 230 for use in game play at table 501.

Figure 6A:
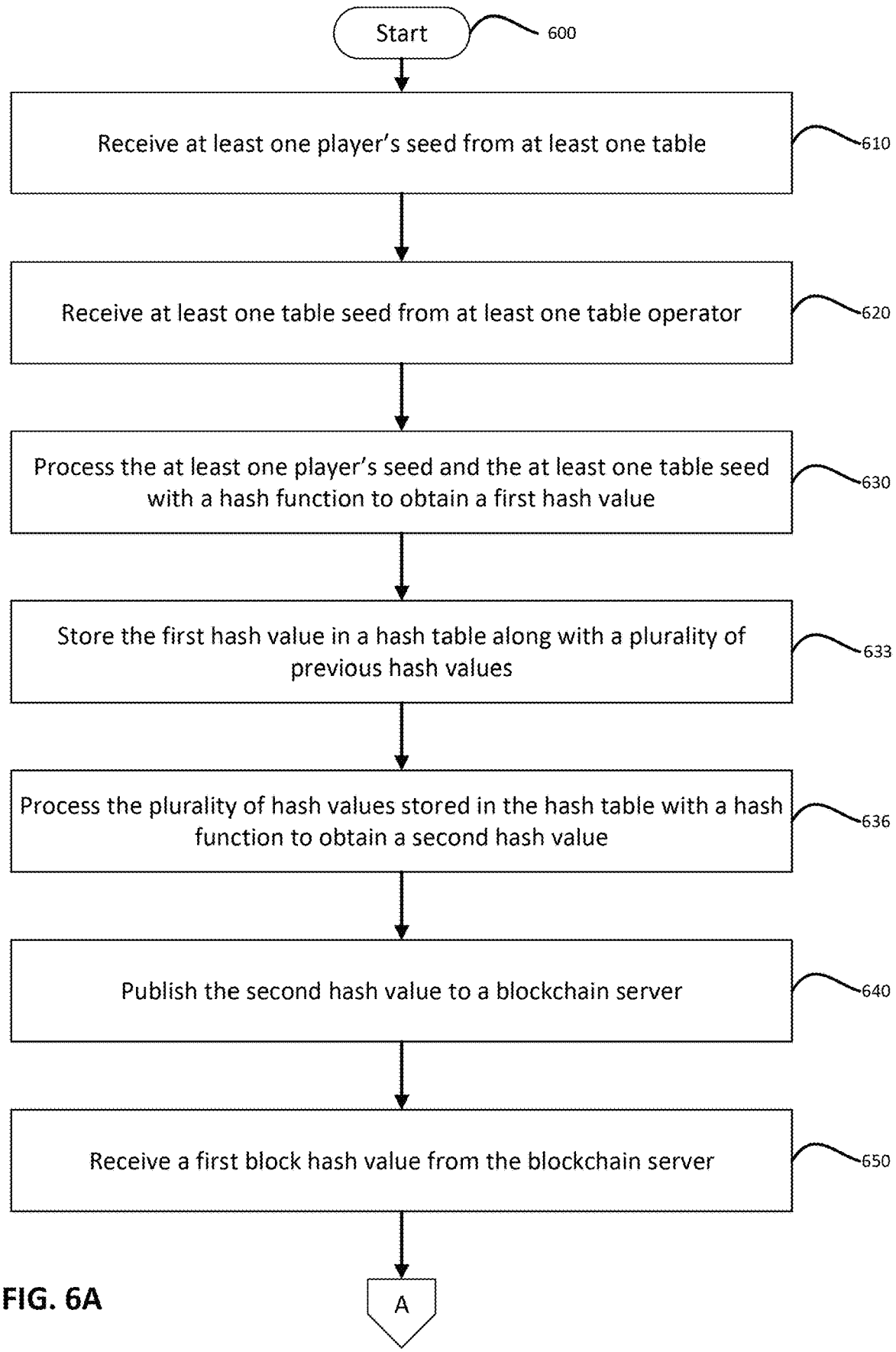
FIGS. 6A and 6B illustrate a flow chart showing another example implementation of random number generation using the random number engine.
Figure 6B:
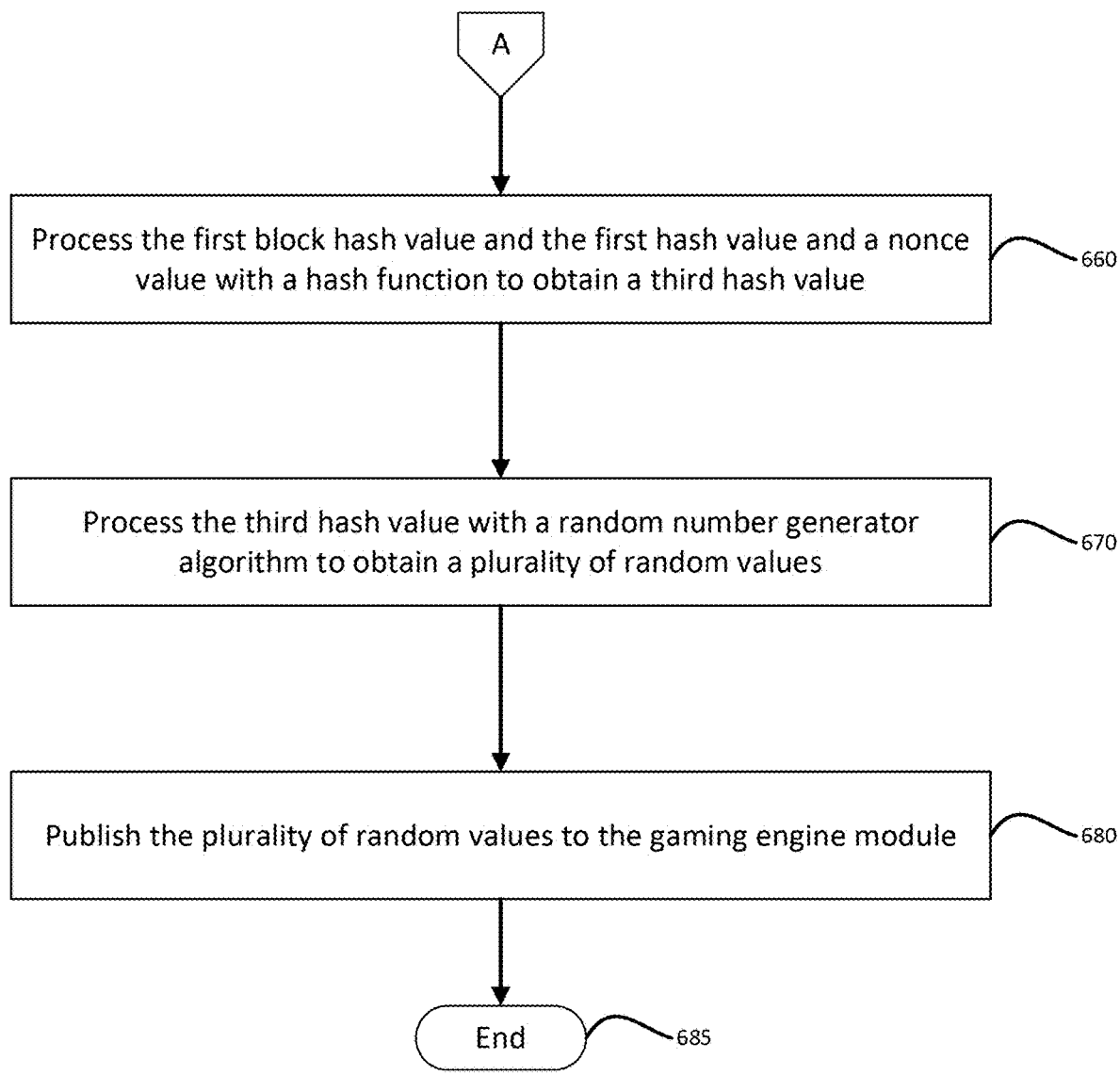

Turning to FIGS. 6A and 6B, an example implementation of a method of random number generation using the random number engine 175 of FIGS. 5A and 5B is shown. In some implementations, the random number engine 175 comprises program code that when executed, can cause a processor 210 to generate random numbers.

In some implementations, the online gaming platform 100 receives at least one player's seed (e.g., from one at least one player at virtual gaming table 501) as illustrated at block 610. For example, a player located at client computing device 130 and joining a virtual gaming table on online gaming platform 100 may be prompted to enter a player selected (and known only to the respective player) combination of alphanumeric letters and/or numbers (or other suitable characters) via a keyboard or similar input device. In some implementations, the player's seed may be retrieved by gaming platform 100 from a stored player account. It should be appreciated that seed values may be received from players or retrieved from a player's account when the player begins a play session at a virtual gaming table of the online gaming platform 100, or at any suitable time. It should further be appreciated that any suitable biometric data, (e.g., the player's fingerprint), may serve to provide the player's seed.

In some implementations, the online gaming platform 100 additionally receives at least one table seed as indicated in block 620. As noted hereinabove, in some implementations, the online gaming system 100 may generate a table seed for one or more tables operated. In some implementations, the online gaming system 100 operator may specify a table seed for each table operated. In some implementations, as tables are created by gaming engine module 230, a predetermined table seed 504 may be retrieved from a memory or a table seed 504 may be randomly generated. In one implementation, the virtual gaming table 501 processes the at least one player's seed and the at least one table seed with a hash function to obtain a first hash value (e.g., a table hash value), as indicated in block 630.

Continuing to block 633, the online gaming platform 100 may transfer the first hash value to RNG server 175. In some implementations, the RNG server 175 may store the first hash value in a hash table along with one or more previous first hash values (e.g., one or more previous first hash values created from one or more other tables and players).

As shown in block 636, RNG server 175 may, in some implementations, process one or more of the hash values stored in the hash table with a hash function to obtain a second hash value. As noted hereinabove, any suitable hash function (e.g., SHA-256) may be utilized to create the second hash value from the plurality of hash values stored in the hash table.

In some implementations, the second hash value can then be published to a blockchain server, at block 640. For example, the RNG server 175 may transmit the second hash value to a public blockchain system and request that the second hash value be written to the public blockchain's ledger. When the public blockchain system receives the second hash value, the public blockchain system may write the second hash value to its ledger. In the process, the public blockchain system may update one or more nodes (e.g., servers) that store the ledger with the second hash value.

In some implementations, after transmitting the second hash value to the public blockchain, the RNG server 175 may request that the public blockchain system transmit a first blockhash value to the RNG server 175. In some implementations, the public blockchain system generates the first blockhash value based on one or more transactions recorded on the public blockchain system's ledger. In some implementations, the public blockchain system's ledger may include the second hash value, such that when the public blockchain system generates the requested first blockhash value, the public blockchain system may include the second hash value as part of the transactions used to create the first blockhash value. In some implementations, the RNG server 175 may receive the first blockhash value the public blockchain server, as illustrated at block 650. Method 600 may continue to block 660 of FIG. 6B as indicated by off-page connector A.

In some implementations, the RNG server 175 may process a grouping of the received first blockhash value, the first hash value, and a nonce value to generate a third hash value, as illustrated at block 660. The RNG server 175 may process the grouping using a suitable hashing function. It should be appreciated that the hashing function may be any suitable hash function and may be the same hash function as the hash function of blocks 510 and 518, or the hash function may be a different hash function (e.g., SHA-3 or other suitable hash function).

As shown in block 670, in some implementations, when the third hash value has been generated, the RNG server 175 can then process the third hash value with a random number generator algorithm to obtain a plurality of random values. In some implementations, the plurality of random values can then be published or transmitted, as indicated via block 680, to gaming engine module 230 for further processing to use in an online game by the online gaming platform 100. In some implementations, method 600 ends with block 685.

In some implementations, the game engine module 230 may be configured to provide a Bad Beat Eligible and Bad Beat Disabled option on a game table in gameplay. In the game of poker, a 'bad beat' is a subjective term for a losing hand that appeared, during gameplay, to be a strong poker hand that would likely win. It should be appreciated that during online poker play, a 'bad beat' often leads to accusations that the random number generator has been compromised or 'rigged' in some manner. It should be appreciated that the system and method for generating random numbers using a public blockchain ledger described herein provides a technological improvement over other random number generation algorithms by providing a high degree of randomness.

In response to the 'bad beat' problem, online gaming operators offering poker table games offer either the Bad Beat Eligible poker table that includes eligibility to win a bad beat jackpot or regular poker table (e.g., a Bad Beat Disabled poker table) that does not include eligibility to win a bad beat jackpot. A bad beat jackpot is a prize awarded to a player having a sufficiently strong hand that loses to a stronger hand of another player. Generally, poker games that offer bad beat jackpots have specific hand requirements for how "strong" a losing hand is to receive the bad beat jackpot.

In addition to the technological advantages of the random number generator engine described herein, some implementations include the Bad Beat Eligible and Bad Beat Disabled option on the same game table provided through the online gaming platform 100. In some implementations, a Bad Beat Disabled player may have a predetermined symbol indication shown in the user interface of the online gaming platform 100 that the bad beat jackpot is unavailable to the Bad Beat Disabled player. A Bad Beat Eligible player may have a predetermined symbol indication showing a Bad Beat Eligible status in the user interface indicating that the player has selected to be eligible for a bad beat jackpot.

In some implementations, the online gaming platform 100 can provide two ways of collecting a Bad Beat ante or rake (e.g., a nominal wager or fee paid by the player to be eligible for a Bad Beat jackpot and utilized to fund the bad beat jackpot) during the gameplay. In some implementations, the Bad Beat Eligible players pay the Bad Beat ante at the beginning of the game. In some other implementations, the Bad Beat Eligible ante is collected from the game pot. For example, in some implementations, the Bad Beat ante is collected from the game pot during the Flop, the Turn and the River with a maximum amount of player antes collected per gameplay rules.

In an example implementation, a Player A can be Bad Beat Eligible, and a Player B can be Bad Beat Disabled. During a poker game play with Player A and Player B, upon the turn card, a bad beat rake of $1.00 dollar may be deducted from the pot, with $0.50 allocated to the Bad Beat Jackpot collection and $0.50 allocated to the Player B who is not participating in the Bad Beat Eligible. Because the Player B is not participating in the bad beat jackpot, the portion of the bad beat rake during the flop, turn or the river, the Player B can be reimbursed for his portion of the bad beat rake. In this manner, individual players can choose whether to participate in the Bad Beat jackpot while playing at the same virtual online poker table in the online gaming platform 100.

In some implementations, on the final card shown during gameplay, Player A can hold a Quad 8 (e.g., four cards having a face value of '8') and lose (e.g., Player A received a 'bad beat' according to predetermined game rules) against the Player B who may hold a Quad 10 (e.g., four cards having a face value of '10'). In some implementations, gaming module 230 may include a rule that a player that received a 'bad beat' (e.g., a loser of the gameplay) gets 50% of a Bad Beat jackpot and winner of the gameplay receives 25% of the Bad Beat jackpot (e.g., when both players are Bad Beat Eligible). However, when the Player A is Bad Beat Eligible and Player B is Bad Beat Disabled, both players do not receive portions of the Bad Beat jackpot. For example, Player A receives 50% of the Bad Beat jackpot for losing under a 'bad beat' scenario and Player B does not receive the 25% portion of the Bad Beat jackpot because Player B did not participate in the bad beat jackpot (e.g., Player B is considered Bad Beat Disabled). In some implementations, the online gaming platform 100 may reserve the 25% of the Bad Beat jackpot that could have been awarded to Player B for the next bad beat jackpot. It should be appreciated that the 50%/25% rates are merely examples and any suitable jackpot award percentages may be used to apportion the Bad Beat jackpot.

Although the random number engine described herein has been described to operate in conjunction with a gaming engine (e.g., to provide wagering games such as casino games, card games, poker games, slot games, blackjack games, roulette games, craps games, lottery games, etc.), it should be appreciated that the random number engine described herein may generate random numbers for any use. Other exemplary applications may include, although are not limited to, cryptography applications such as confidentiality, encryption, authentication, electronic commerce and the like; simulations, statistical analyses, Monte Carlo simulations, auditing, or any other application where secure verifiable randomness is desired.

The online gaming platform disclosed herein can be programmed into a computer readable media. Computer-readable media includes both computer storage media and communication media including any medium that facilitates transfer of a computer program from one place to another. A storage medium may be any available medium that can be accessed by a special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a special-purpose computer, or a special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The present disclosure is not to be limited in terms of the particular implementations described in this application, which are intended as illustrations of various aspects. Moreover, the various disclosed implementations can be interchangeably used with each other, unless otherwise noted. Many modifications and variations can be made without departing from its spirit and scope, as will be apparent to those skilled in the art. Functionally equivalent methods and apparatuses within the scope of the disclosure, in addition to those enumerated herein will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular implementations only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

A number of implementations of the invention have been described. Various modifications may be made without departing from the spirit and scope of the invention. For example, various forms of the flows shown above may be used, with steps re-ordered, added, or removed. Accordingly, other implementations are within the scope of the following claims.

What is claimed is:

1. An online gaming platform comprising:
   at least one computer server communicable with at least one client computing device over a network, the computer server having a processor and a memory;
   a gaming engine module stored on the memory and executable by the processor, the gaming engine module having program code that when executed, generates an interactive gameplay instance playable on the at least one client computing device;
   a random number engine in communication with the at least one computer server and the at least one client computing device, the random number engine configured to:
     receive at least one player's seed from the at least one client computing device;
     receive at least one platform's seed from the at least one computer server;
     process the at least one player's seed and the at least one platform's seed with a hash function to obtain a first hash value;
     publish the first hash value to a blockchain server;
     receive a first blockhash value from the blockchain server;
     process the first blockhash value and the first hash value with the hash function to obtain a final hash value;
     process the final hash value with a random number generator algorithm to obtain a plurality of random values; and
     publish the plurality of random values to the gaming engine module.

2. The online gaming platform of claim 1, wherein the hash function is an SHA-256 cryptographic function.

3. The online gaming platform of claim 1, wherein the random number engine is further configured to:
   receive a new blockhash value after a predetermined period; and
   substitute the first blockhash value with the new blockhash value to obtain the plurality of random values.

4. The online gaming platform of claim 3, wherein the predetermined period is 12 seconds.

5. The online gaming platform of claim 1, wherein the at least one player's seed is a random numerical, alphabetical, and alpha-numerical value.

6. The online gaming platform of claim 1, wherein the random number engine is further configured to:
   verify integrity of the at least one player's seed based on the recorded first hash value.

7. The online gaming platform of claim 1, wherein the blockchain server is a public blockchain server.

8. The online gaming platform of claim 1, wherein the gameplay is based on the plurality of random values.

9. The online gaming platform of claim 1, wherein the gameplay is for an online wager-based game.

10. The online gaming platform of claim 1, wherein the online gaming platform further comprises a virtual currency module stored in the memory and executable by the processor, the virtual currency module having program code that when executed, issues and manages virtual currency accounts in addition to performing currency exchange between fiat currency and virtual currency, displays in near real time, on the client computing device, balance and transactions of the virtual currency account in the fiat currency value, issues private keys for operating the virtual currency accounts, and wherein the virtual currency can be received in the virtual currency account by winning in a game.

11. The online gaming platform of claim 10, wherein the online gaming platform further comprises a ghost module stored on the memory and executable by the processor, the ghost module having program code that when executed operably couple the online gaming platform with other crypto exchange platforms.

12. The online gaming platform of claim 10, wherein the virtual currency module further comprises program code that when executed, issues credits, tokens, and gifts as the virtual currency.

13. The online gaming platform of claim 10, wherein the virtual currency is in one of Bitcoin, Litecoin, and Ripple.

14. The online gaming platform of claim 10, wherein the virtual currency module further comprises a digital wallet module.

15. The online gaming platform of claim 10, wherein the online gaming platform is integrated with an exchange module to enable multiple virtual currencies to be used simultaneously, wherein said virtual currencies are transferred between accounts by utilizing funds held off-platform to perform the gameplay, and crediting the funds back to the off-platform.

16. The online gaming platform of claim 1, wherein the gaming engine module provides for Bad Beat eligible and disable option on a same game table during a gameplay.

17. The online gaming platform of claim 1, wherein the blockchain server comprises a distributed blockchain server.

18. An online gaming platform comprising:
  at least one computer server communicable with at least one virtual gaming table over a network, the computer server having a processor and a memory;
  a gaming engine module stored on the memory and executable by the processor, the gaming engine module having program code that when executed, generates an interactive gameplay instance playable on the virtual gaming table;
  a random number engine in communication with the at least one computer server and the at least one virtual gaming table, the random number engine configured to:
    receive at least one player's seed from the at least one virtual gaming table;
    receive at least one table seed from the at least one computer server;
    process the at least one player's seed and the at least one table seed with a hash function to obtain a first hash value;
    store the first hash value in a collection of hash values;
    process the collection of hash values with a hash function to obtain a second hash value;
    publish the second hash value to a blockchain server;
    receive a first blockhash value from the blockchain server;
    process the first blockhash value and the first hash value and a nonce value with the hash function to obtain a final hash value;
    process the final hash value with a random number generator algorithm to obtain a plurality of random values; and
    publish the plurality of random values to the gaming engine module.

19. The online gaming platform of claim 18, wherein the hash function is a SHA-256 cryptographic function.

20. The online gaming platform of claim 18, wherein the blockchain server is a public blockchain server.

* * * * *